(12) United States Patent
Kim et al.

(10) Patent No.: US 7,854,853 B2
(45) Date of Patent: Dec. 21, 2010

(54) NANO FABRICATION METHOD FOR GLASS

(75) Inventors: Pan-Kyeom Kim, Gyeongsangbukdo (KR); Geun-Bae Lim, Gyeongsangbukdo (KR)

(73) Assignee: Postech Academy-Industry Foundation, Pohang (KR)

( * ) Notice: Subject to any disclaimer, the term of this patent is extended or adjusted under 35 U.S.C. 154(b) by 1077 days.

(21) Appl. No.: 11/595,077

(22) Filed: Nov. 9, 2006

(65) Prior Publication Data

US 2008/0110863 A1 May 15, 2008

(51) Int. Cl.
*B44C 1/22* (2006.01)
(52) U.S. Cl. .............................. 216/58; 216/31; 216/80; 438/723
(58) Field of Classification Search .................... 216/31, 216/80, 97, 58, 63; 438/723
See application file for complete search history.

(56) References Cited

U.S. PATENT DOCUMENTS

| | | | | |
|---|---|---|---|---|
| 3,370,948 | A | * | 2/1968 | Rosenbauer ................ 430/323 |
| 7,179,527 | B2 | * | 2/2007 | Sato et al. ................... 428/333 |
| 7,399,681 | B2 | * | 7/2008 | Couillard et al. ............ 438/458 |
| 2002/0014263 | A1 | * | 2/2002 | Sasaki ......................... 136/255 |

* cited by examiner

*Primary Examiner*—Lan Vinh
(74) *Attorney, Agent, or Firm*—Marshall, Gerstein & Borun LLP (57) ABSTRACT

An exemplary embodiment of the present invention provides a nano fabrication method for a glass, the method including forming a molecule substituting layer on a glass substrate, patterning the molecule substituting layer correspondent to shapes to be patterned on the glass substrate, substituting crystal atoms of the glass substrate with atoms of the molecule substituting layer, removing the patterned molecule substituting layer from the glass substrate, and etching the molecule substituted portion of the glass substrate.

14 Claims, 12 Drawing Sheets

NANO FABRICATION METHOD FOR GLASS

BACKGROUND OF THE INVENTION (a) Field of the Invention

The present invention relates to a nano fabrication method for a glass. More particularly, the present invention relates to a nano fabrication method for processing a three dimensional structure by applying molecule substitution to a crystal structure of a glass.

(b) Description of the Related Art

Recently, nano scale fabrications have been widely researched and developed for industrial purposes.

The nano scale fabrications may be classified into a top-down method and a bottom-up method.

The top-down method is a method for manufacturing a nano structure by removing predetermined portions from a thin film or a bulk material.

The bottom-up method is a method for manufacturing a nano structure by accumulating small blocks by self-assembly.

A lithography method has been the most popular method for manufacturing a nano structure, and a method using an electron beam is most general among lithography methods.

The electron beam lithography method patterns a material reacting with electrons by using an electron beam. The electron beam lithography method is used for manufacturing various nano structures by co-using other processes such as lift-off, etching, and electro-deposition.

However, the electron beam lithography method has a drawback of low productivity as a serial process, and the drawback is critical for mass production.

Accordingly, a nano-imprint method has recently emerged to compensate the drawback of the electron beam lithography method. The nano-imprint method can manufacture many nano structures with one stamp in less time.

In addition, when a scanning probe microscopy (SPM) system is adopted, tip control of molecular size can be controlled with an accuracy of smaller than nano scale. Therefore, the adoption of the SPM system is being widely tried for manufacturing a nano structure.

However, if the SPM system uses only one tip for processing, the process becomes a serial process, and thus the process gets much slower and is not suitable for mass production.

Self-assembly basically means forming a structure by nano particles chemically or physically clustering.

The self-assembly can be divided into physical self-assembly and chemical self-assembly.

Physical self-assembly is forming a stable structure by natural interactions resulted from collisions of particles due to entropy.

Particularly, when template-assist self-assembly among physical self-assembly methods is adopted, a structure having a predetermined pattern can be formed.

Chemical self-assembly is forming a molecule layer by detecting and joining molecules, and thus can form multiple layers so as to form a complex structure.

On the contrary to reducing manufacturing time for simple structures, the above nano fabrication methods have the drawback of a longer manufacturing time for complex structures.

Consequently, new nano fabrication methods that can easily and rapidly manufacture nano scale structures having a complex shape are significantly required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a nano fabrication method for a glass having advantages of easy and rapid processing for nano scale structures having a complex shape by applying molecule substitution between glass crystal atoms and metal atoms.

An exemplary embodiment of the present invention provides a nano fabrication method for a glass, the method including: forming a molecule substituting layer whereby a crystal atom is a larger size than a glass crystal atom and the charge difference therebetween is less than or equal to one on a glass substrate; patterning the molecule substituting layer correspondent to shapes to be patterned on the glass substrate; substituting crystal atoms of the glass substrate with atoms of the molecule substituting layer; removing the patterned molecule substituting layer from the glass substrate; and etching the molecule substituted portion of the glass substrate.

In forming the molecule substituting layer, the molecule substituting layer can be formed as a metal film that allows molecular replacement with crystal atoms of the glass substrate.

The metal film can be formed by a sputtering method, or by any thermal deposition method among a filament deposition, an electron beam deposition, an RF electric power deposition, and a flash deposition.

The glass substrate can be a boro-silicate glass substrate, and the metal film is formed as an aluminum film.

In forming the molecule substituting layer, the molecule substituting layer can be formed as a non-metal film that allows molecular replacement with crystal atoms of the glass substrate. The non-metal film can be formed by a chemical vapor deposition method.

In patterning the molecule substituting layer, the molecule substituting layer can be patterned by an exposure, a development, and an etching process. A pattern thickness of the molecule substituting layer can be proportional to a pattern depth of the glass substrate. The molecular replacement is activated by applying heat and an electric field to the glass substrate and the metal film.

A pattern depth of the glass substrate can be proportional to the voltage of the electric field. Alternatively, the pattern depth of the glass substrate can be proportional to the temperature of the heat treatment. Further, the pattern depth of the glass substrate can be controlled by combination of the temperature of the heat treatment and the voltage of the electric field.

Another embodiment of the present invention provides a nano fabrication method for a glass, the method including: a molecule substituting layer fabrication step in which a predetermined shape is fabricated at a molecule substituting layer; an adhering step in which the molecule substituting layer is adhered on a glass substrate; a substituting step in which crystal atoms of the glass substrate are substituted with atoms of the molecule substituting layer; a removing step in which the patterned molecule substituting layer is removed from the glass substrate; and an etching step in which the molecule substituted portion of the glass substrate is etched to be patterned.

BRIEF DESCRIPTION OF THE DRAWINGS

FIG. 12A to FIG. 12D are graphs showing results of a nano fabrication method for a glass consistent with applied voltages of Experimental Example 3.

DETAILED DESCRIPTION OF THE EMBODIMENTS

Exemplary embodiments of the present invention will hereinafter be described in detail with reference to the accompanying drawings. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

First, the theoretical background of a nano fabrication method for a glass consistent with the present invention will be described with reference to the accompanying drawings.

FIG. 1A to FIG. 1D are drawings describing the theoretical background of the nano fabrication method for a glass consistent with the present invention.

Referring to these drawings showing the basic mechanism of the nano fabrication method for a glass consistent with the present invention, when two materials are exposed to heat and an electric field, molecules of the two materials are substituted with each other so that the bonding of the molecules is weakened so as to be easily etched.

Figure 1A:
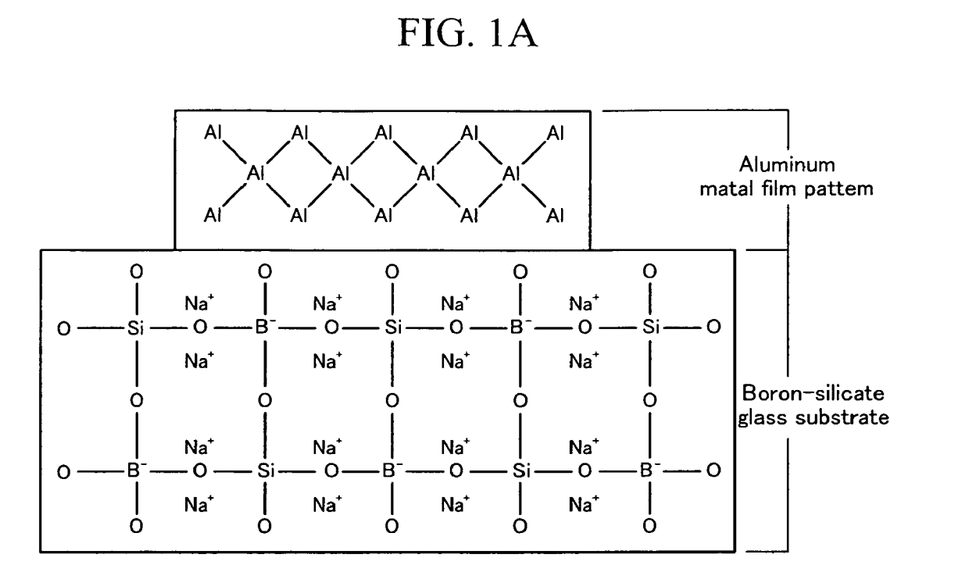
FIG. 1A to FIG. 1D are drawings describing the theoretical background of a nano fabrication method for a glass consistent with the present invention.

In more detail, as shown in FIG. 1A, an aluminum metal film pattern is formed on a boro-silicate glass substrate, which is used as a glass substrate.

Figure 1B:
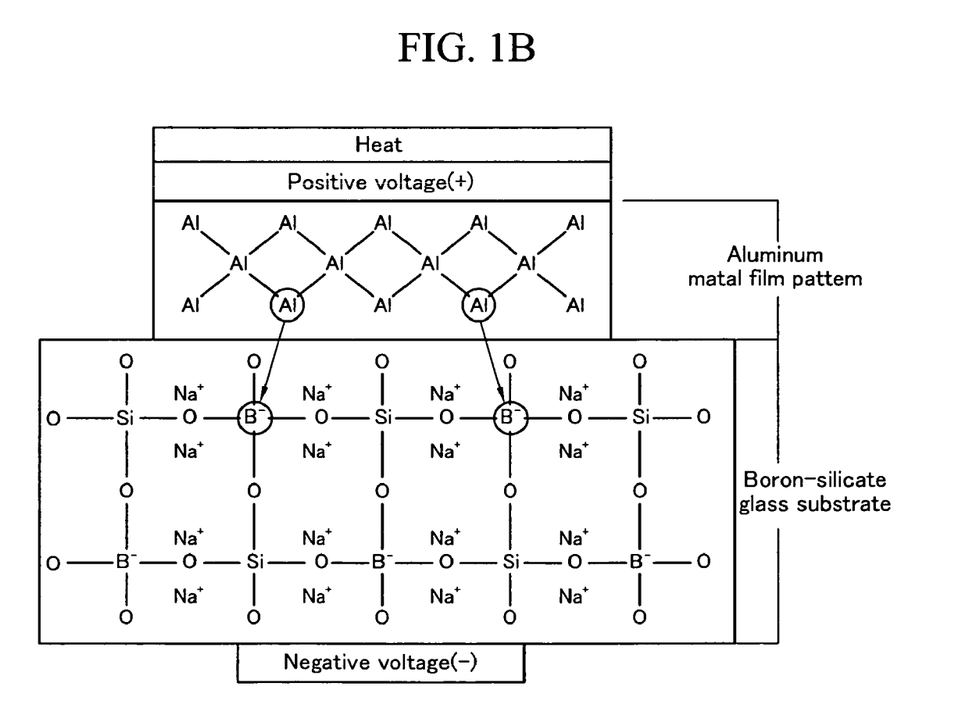
Figure 1C:
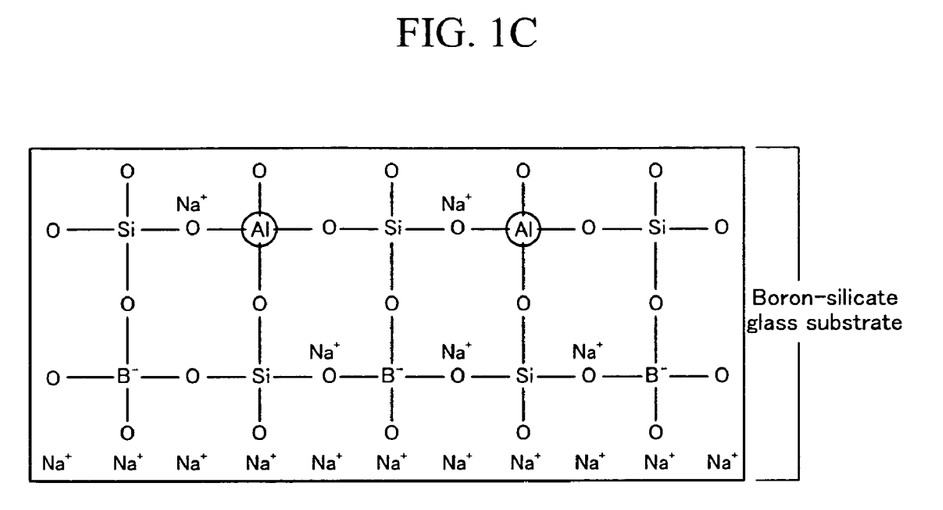

As shown in FIG. 1B and FIG. 1C, when heat and an electric field are applied, aluminum (Al) atoms in the metal film pattern are substituted with boron (B) atoms in a crystal structure of the boro-silicate glass substrate.

Figure 1D:
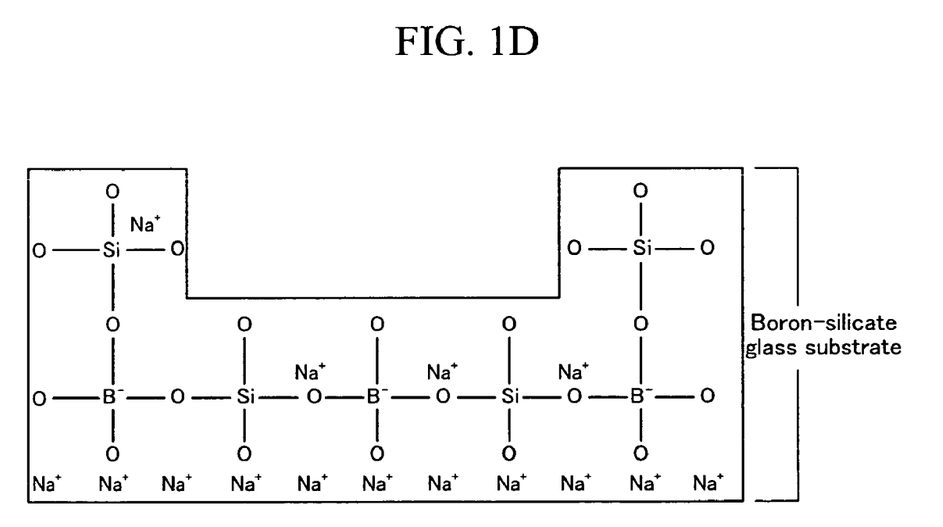

As shown in FIG. 1D, the substituting aluminum (Al) atoms have a larger size than the boron (B) atoms, and so the molecular structure of the molecule substituted glass substrate gets weakened.

And then, when the molecule substituted glass substrate is dipped into an etchant such as fluoric acid (HF), the portion in which the molecular structure is weakened is etched to be patterned.

An exemplary embodiment of the present invention will hereinafter be described in detail with reference to the accompanying drawings.

Figure 2:
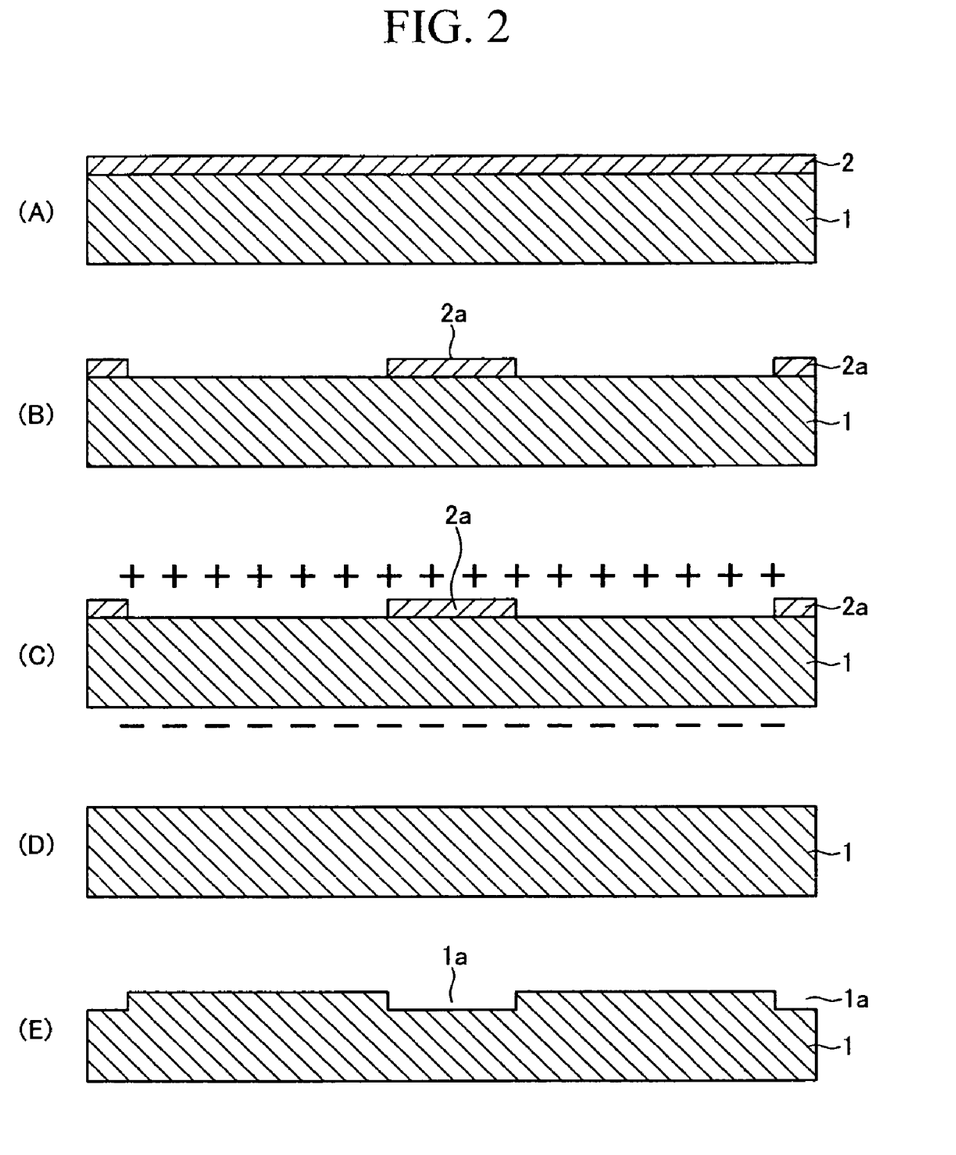
FIG. 2 shows principal stages of a nano fabrication method for a glass according to an exemplary embodiment of the present invention.

FIG. 2 shows principal stages of a nano fabrication method for a glass according to an exemplary embodiment of the present invention.

A nano fabrication method for a glass according to the exemplary embodiment includes a molecule substituting layer forming step, a patterning step, a molecule substituting step, a molecule substituting layer removing step, and an etching step.

Referring to (a) of FIG. 2, in the molecule substituting layer forming step, a molecule substituting layer 2 is formed on a glass substrate 1.

Atoms in the molecule substituting layer 2 and atoms in a crystal structure of the glass substrate 1 can be metal or non-metal that can be substituted with each other.

The substitution between the atoms in the crystal structure of the glass substrate 1 and the atoms in the molecule substituting layer 2 is performed according to Goldschmidt's rule.

According to Goldschmidt's rule, the size difference between the molecules substituted should be less than or equal to 15%, and the charge difference therebetween should be less than or equal to one.

Therefore, when the electro negativity or the kind of molecular bonding are the same, the molecule substitution can easily happen.

Accordingly, the material of the molecule substituting layer 2 on the glass substrate 1 can be a metal or a non-metal that has a larger size than a glass atom so as to be substituted with a glass crystal atom of the glass substrate 1 and to weaken the molecular structure of the substituted glass substrate 1.

When a metal molecule substituting layer 2 is formed on the glass substrate 1, it is formed as a thin film and should be formed at a relatively low temperature. Accordingly, the metal film is usually formed at a low pressure, and so the process is a kind of vacuum deposition method.

The vacuum deposition methods include a sputtering method and a thermal evaporation method. The thermal evaporation method includes a filament evaporation method, an electron beam evaporation method, a RF electric power deposition method, and a flash evaporation method. A more detailed description for these conventional methods is omitted.

When a non-metal molecule substituting layer 2 is formed on the glass substrate 1, the molecule substituting layer 2 can be formed by a sputtering method, but it is preferable to be formed by a chemical vapor deposition method.

The chemical vapor deposition method is a method in which a compound in a gas state is decomposed and deposited on a substrate as a thin film or an epitaxial layer by chemical reactions.

The exemplary embodiment illustrates a boro-silicate glass in which boron is inserted into a crystal structure of a glass. Pyrex glass manufactured by Corning from the United States is used as the boro-silicate glass substrate.

In addition, aluminum (Al), which has a larger atom size than boron and so aluminum atoms can be easily substituted with boron (B) atoms in the crystal structure of the Pyrex glass substrate 1, is illustrated as a material of the molecule substituting layer 2 on the Pyrex glass substrate 1.

Consequently, in the molecule substituting layer forming step, an aluminum (Al) metal layer 2 is formed on the Pyrex glass substrate 1 by sputtering.

Referring to (b) of FIG. 2, in the patterning step, the aluminum metal film 2 is patterned to be correspondent with shapes to be patterned on the aluminum metal film 2.

In patterning the aluminum metal film 2, a photo resistive film (e.g., AZ5214) is coated on the aluminum metal film 2, and an exposure process, a developing process, and an etching process follow.

In the exposure process, the photo resistive film is exposed to a UV light source and developed by using a developing solution (e.g., AZ300MIF). After the patterning process, the substrate is dipped into an etchant for aluminum in which $H_3PO_4$, $HNO_3$, $HC_2H_3O_2$, and $H_2O$ are mixed with a ratio of 16:1:1:2.

A thickness of a pattern 2a of the aluminum metal film affects a depth in which aluminum (Al) atoms are substituted with boron (B) atoms in the Pyrex glass substrate 1.

Consequently, the thickness of the pattern 2a of the aluminum metal film becomes a main factor for determining a pattern depth of the Pyrex glass substrate 1.

Referring to (c) of FIG. 2, in the molecule substituting step, the Pyrex glass substrate 1 with the aluminum metal film pattern 2a is applied with a heat treatment and an electric field treatment so that boron (B) atoms in the crystal structure of the Pyrex glass substrate 1 can be substituted with aluminum (Al) atoms in the aluminum metal film pattern 2a.

The heat treatment and the electric field treatment should be simultaneously performed, and various pattern depths of the Pyrex glass substrate 1 can be achieved according to the temperature of the heat treatment and the applied voltage of the electric field treatment.

Consequently, the temperature and the applied voltage act as main variables for determining the pattern depth of the Pyrex glass substrate 1.

When the electric field treatment is applied to the Pyrex glass substrate 1, a polar direction thereof affects the treatment.

Consequently, considering movements of the molecules, it is preferable that a negative (−) voltage is applied to a bottom plane of the Pyrex glass substrate 1 and a positive (+) voltage is applied to the aluminum metal film pattern 2a on a top plane of the Pyrex glass substrate 1.

Such a molecule substitution weakens the molecular structure of the Pyrex glass substrate 1 corresponding to the shape of the aluminum metal film pattern 2a.

Referring to (d) of FIG. 2, in the molecule substituting layer removing step after substituting the atoms by the heat treatment and the electric field treatment, the remaining aluminum metal film pattern 2a is removed from the Pyrex glass substrate 1.

In order to remove the remaining aluminum metal film pattern 2a from the Pyrex glass substrate 1, the etchant for aluminum that was used in the patterning step is used.

If the aluminum metal film pattern 2a remains, it can affect other processes, and so the aluminum metal film pattern 2a should be cleanly removed.

Referring to (e) of FIG. 2, in the etching step, the portion in which the molecular structure is weakened by the molecule substitution of the Pyrex glass substrate 1 is etched to be patterned to a predetermined pattern 1a.

The etchant for the Pyrex glass substrate 1 is a fluoric acid (HF) solution, and the dilution concentration of the fluoric acid (HF) solution can be enhanced to increase etching speed. The etchant can be another kind of etchant.

As described above, the thickness of the aluminum metal film pattern 2a, the temperature of the heat treatment, and the voltage for applying an electric field can be controlled so that more complicated three-dimensional nano structures can be fabricated.

Figure 3:
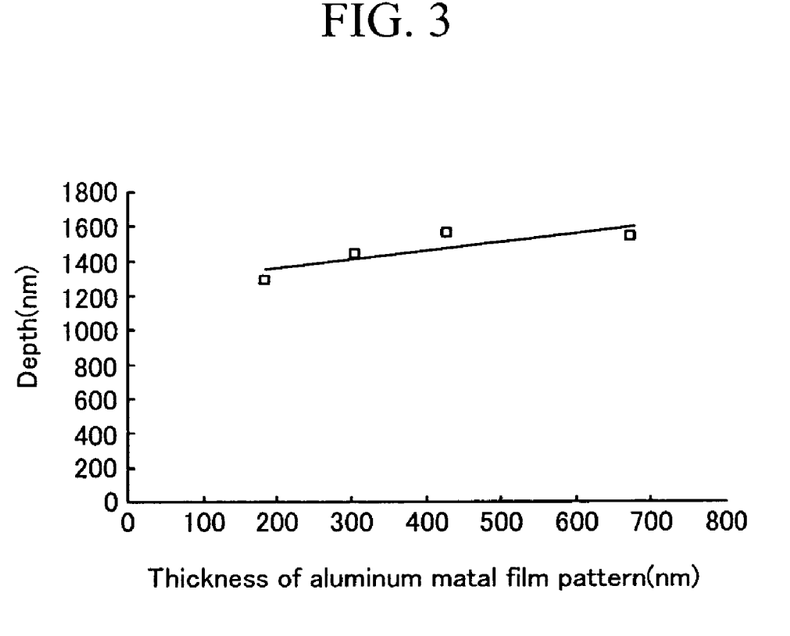
FIG. 3 is a graph showing a relationship between pattern depth and thickness of a metal film according to an exemplary embodiment of the present invention.

FIG. 3 is a graph showing a relationship between pattern depth and thickness of a metal film according to an exemplary embodiment of the present invention.

Referring to FIG. 3, when a nano structure is patterned according to the nano fabrication method for a glass, as the thickness of the aluminum metal film pattern 2a is increased, the pattern depth of the Pyrex glass substrate 1 is proportionally increased.

The reason is that aluminum (Al) atoms of the aluminum metal film pattern 2a are deeply substituted with boron (B) atoms of the Pyrex glass substrate 1 in the molecule substituting step.

Figure 4:
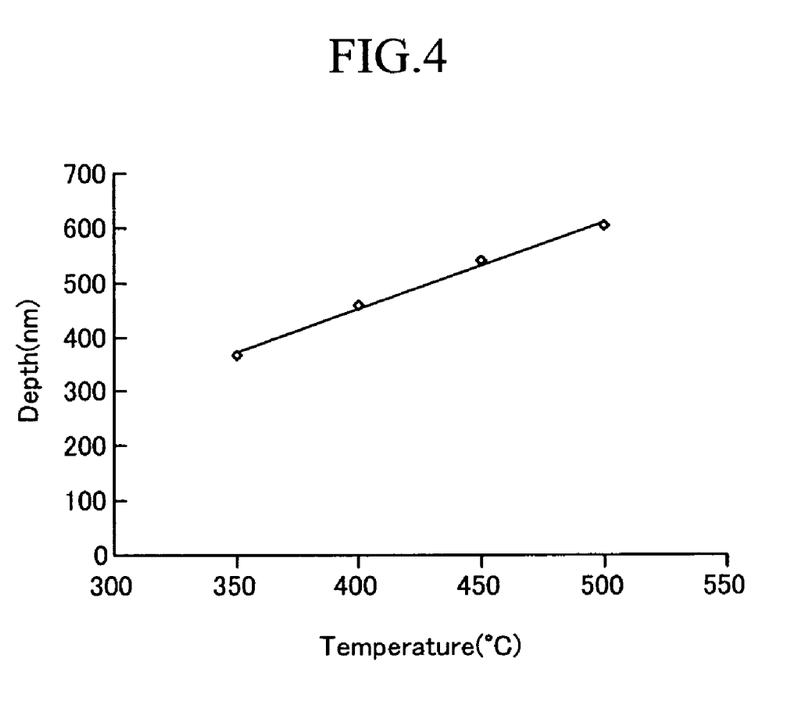
FIG. 4 is a graph showing a relationship between pattern depth and temperature of a heat treatment according to an exemplary embodiment of the present invention.

FIG. 4 is a graph showing a relationship between pattern depth and temperature of a heat treatment according to an exemplary embodiment of the present invention.

Referring to FIG. 4, when a nano structure is patterned, as the temperature of the heat treatment in the molecule substituting step is increased, the pattern depth of the Pyrex glass substrate 1 is proportionally increased.

As the temperature of the heat treatment in the molecule substituting step is increased, the number of aluminum (Al) atoms of the aluminum metal film pattern 2a that are substituted with boron (B) atoms of the Pyrex glass substrate is increased.

Figure 5:
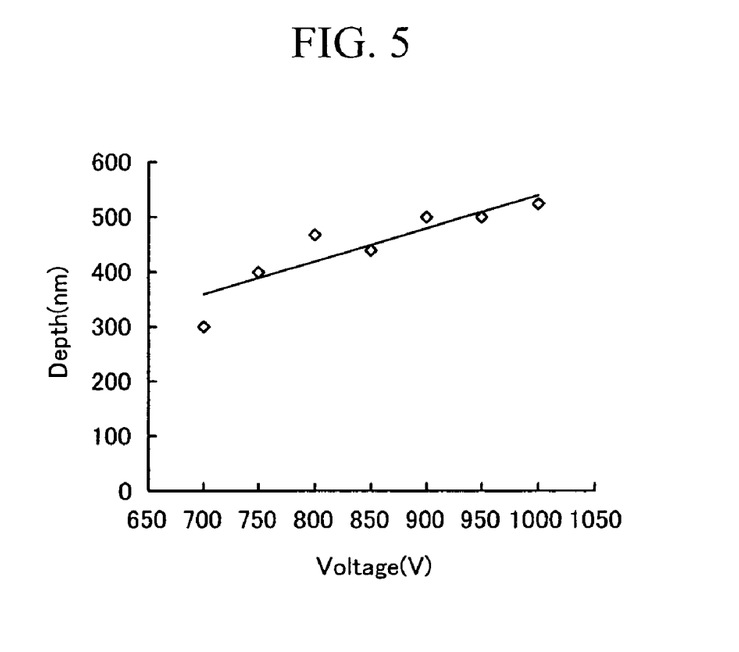
FIG. 5 is a graph showing a relationship between pattern depth and applied voltage according to an exemplary embodiment of the present invention.

FIG. 5 is a graph showing a relationship between pattern depth and applied voltage according to an exemplary embodiment of the present invention.

Referring to FIG. 5, when a nano structure is patterned according to the nano fabrication method for a glass, the pattern depth of the Pyrex glass substrate 1 is increased proportionally with the voltage for applying an electric field in the molecule substituting step.

As the voltage applying an electric field in the molecule substituting step is increased, the number of aluminum (Al) atoms of the aluminum metal film pattern 2a that are substituted with boron (B) atoms of the Pyrex glass substrate is increased.

As described above, the thickness of the aluminum metal film pattern 2a, the temperature of the heat treatment, and the voltage for applying an electric field can be controlled so that various pattern depths can be obtained. Consequently, more complicated three-dimensional nano structures can be fabricated.

Hereinafter, experimental results with experimental parameters of the aluminum metal film pattern 2a thickness, the heat treatment temperature, and the applied voltage will be explained.

The Experimental Examples of the present invention are provided only to illustrate embodiments consistent with the present invention, and it is to be understood that the invention is not limited to the disclosed Experimental Examples.

Experimental Example 1

Figure 6:
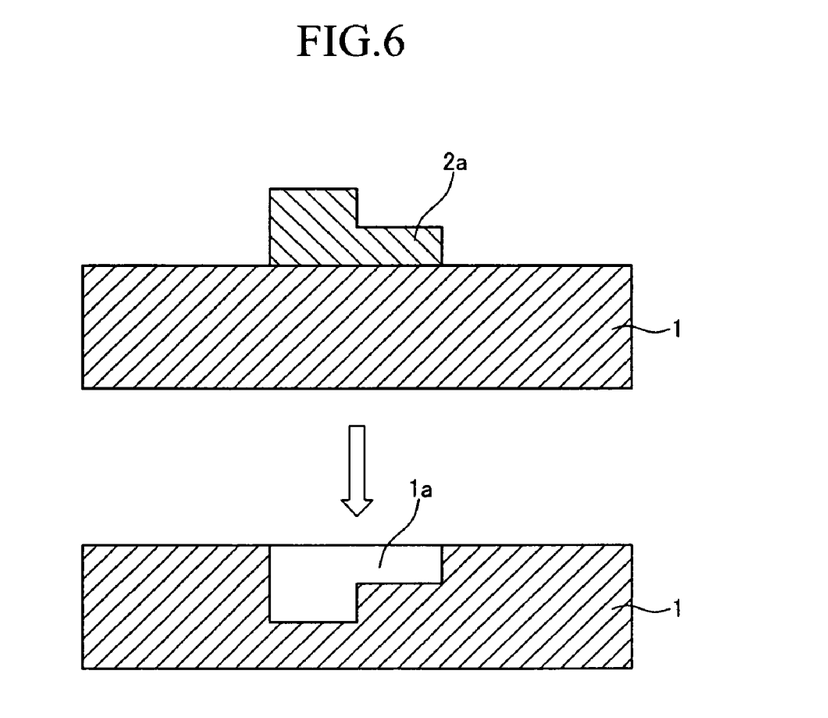
FIG. 6 is a drawing showing principal stages of a nano fabrication method for a glass according to Experimental Example 1.

In Experimental Example 1, the thickness of the aluminum metal film pattern 2a on the Pyrex glass substrate 1 is selected as a variable. When the temperature and the applied current are constant, the Pyrex glass substrate 1 is patterned to have different pattern depths.

FIG. 6 is a drawing showing principal stages of a nano fabrication method for a glass according to Experimental Example 1.

Referring to FIG. 6, the aluminum metal film pattern 2a is formed to have a step shape so as to have two different thicknesses.

During the molecule substituting step, aluminum atoms in the thicker portion of the aluminum metal film pattern 2a are more deeply substituted with boron atoms of the Pyrex glass substrate 1 rather than the thinner portion thereof.

Subsequently, in the molecule substituting layer removing step, remaining aluminum metal film pattern 2a is removed from the Pyrex glass substrate 1.

And then, in the etching step, the Pyrex glass substrate 1 is dipped into a fluoric acid (HF) solution, and the pattern 1a, which has a mirror shape with respect to the shape of the aluminum metal film pattern 2a, is patterned.

Figure 7A:
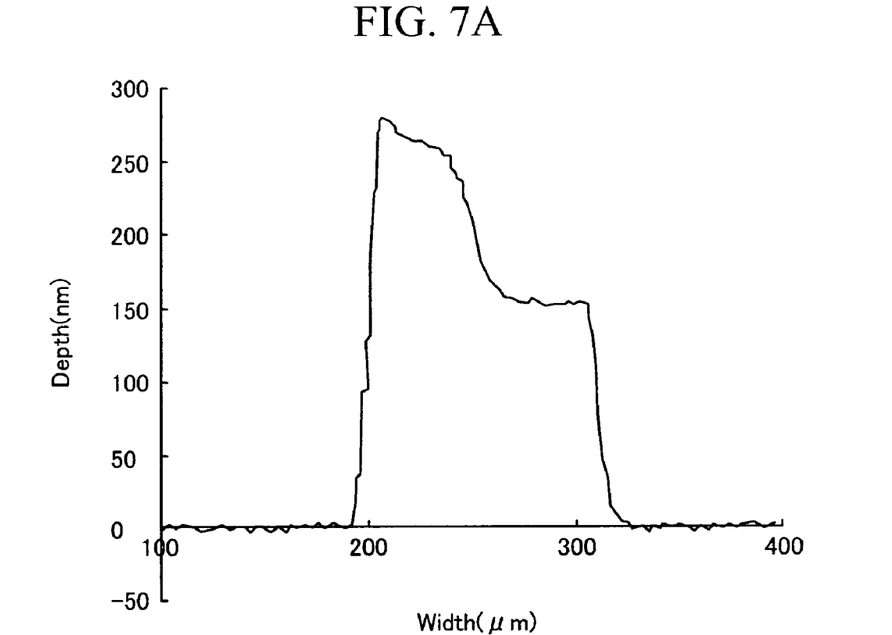
FIG. 7A is a graph showing the shape of the aluminum metal film pattern of Experimental Example 1.
Figure 7B:
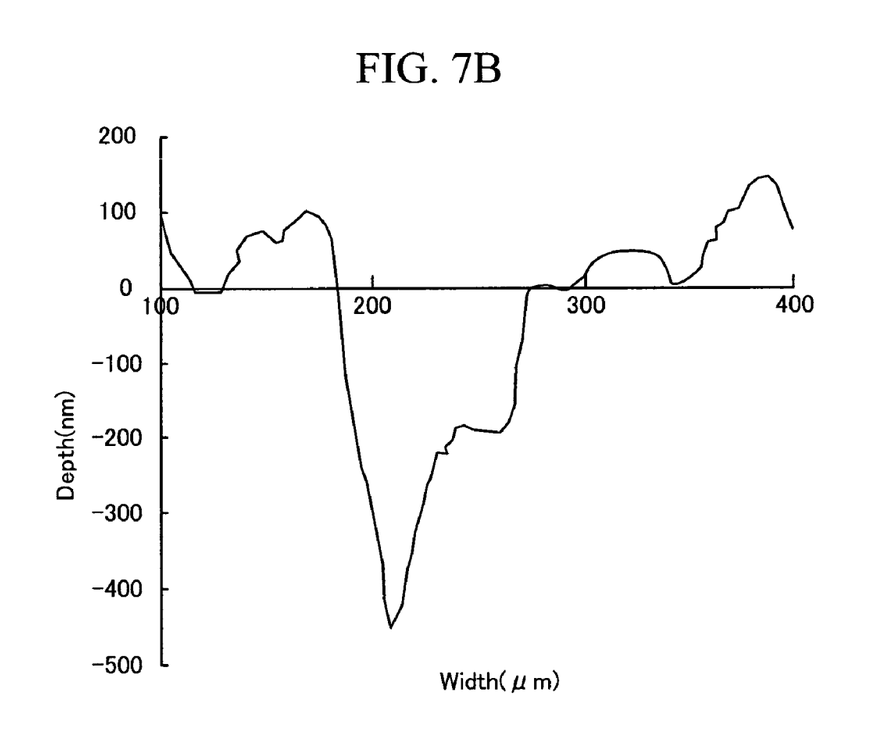
FIG. 7B is a graph showing a result of a nano fabrication method for a glass consistent with the aluminum metal film pattern of Experimental Example 1.

FIG. 7A is a graph showing the shape of the aluminum metal film pattern before the etching step in Experimental Example 1, and FIG. 7B is a graph showing a result of a nano fabrication method for a glass consistent with the aluminum metal film pattern of Experimental Example 1.

As shown in the graphs in FIG. 7A and FIG. 7B, the pattern 1a of the Pyrex glass substrate 1 after the etching step has a width and a depth that are mirror images of the width and thickness of the aluminum metal film pattern 2a before the etching step.

Accordingly, the thickness of the aluminum metal film pattern 2a is controlled so that the pattern 1a can have various pattern depths, and thus more complicated three-dimensional nano structures can be fabricated.

Experimental Example 2

Figure 8:
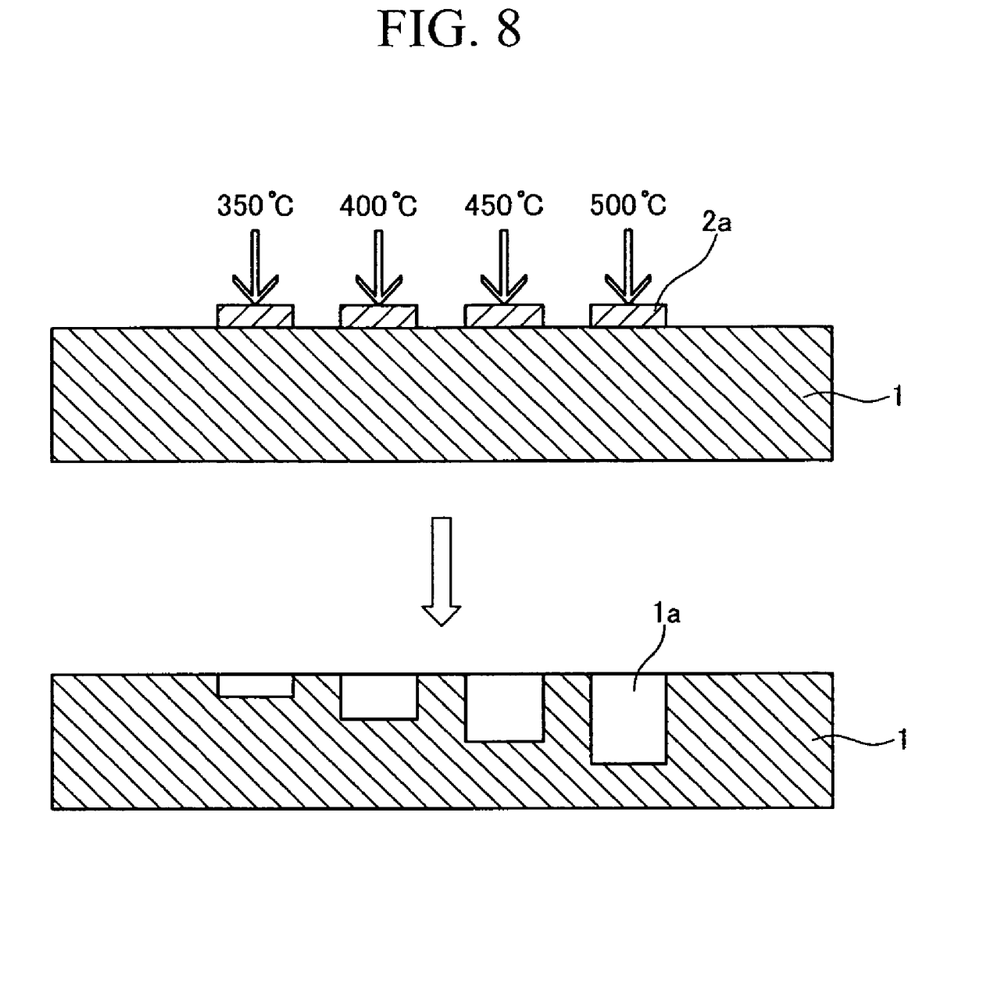
FIG. 8 is a drawing showing principal stages of a nano fabrication method for a glass according to Experimental Example 2.

In Experimental Example 2, the temperature of the heat treatment is selected as a variable. When the thickness of the aluminum metal film pattern 2a and the applied current are constant, the Pyrex glass substrate 1 is patterned to have different pattern depths.

FIG. 8 is a drawing showing principal stages of a nano fabrication method for a glass according to Experimental Example 2.

Referring to FIG. 8, aluminum metal film patterns 2a having the same thickness by a metal film forming step and a patterning step are formed on a Pyrex glass substrate 1.

In the molecule substituted step, electric fields of the same voltage of 1000V are applied to the patterns, and heat treatments are respectively performed to those patterns with different temperatures of 350° C., 400° C., 450° C., and 500° C., respectively.

After the metal film removing step and the etching step are performed, the pattern depth of the Pyrex glass substrate 1 is proportional to the heat treatment temperature.

Figure 9:
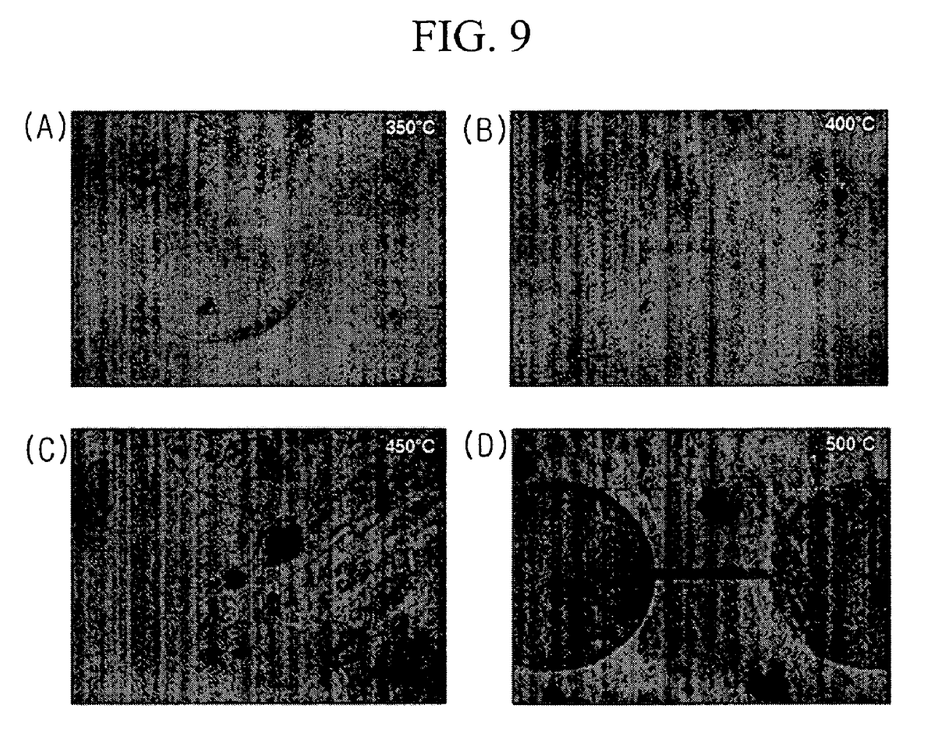
FIG. 9 is a collection of photographs showing results from a nano fabrication method for a glass according to the temperature of the heat treatment of Experimental Example 2.

FIG. 9 is a collection of photographs showing results from a nano fabrication method for a glass according to the temperature of the heat treatment of Experimental Example 2.

The pictures are photographed by a microscope after the etching step following the heat treatments of 350° C. for (a), 400° C. for (b), 450° C. for (c), and 500° C. for (d).

As shown in the photographs (a) to (d) of FIG. 9, as the temperature is increased, the image becomes clearer and the pattern depth becomes deeper.

Consequently, the temperature of the heat treatment in the molecule substituting step in a nano fabrication method for a glass can be controlled so that the Pyrex glass substrate 1 can have a predetermined pattern depth.

Experimental Example 3

Figure 10:
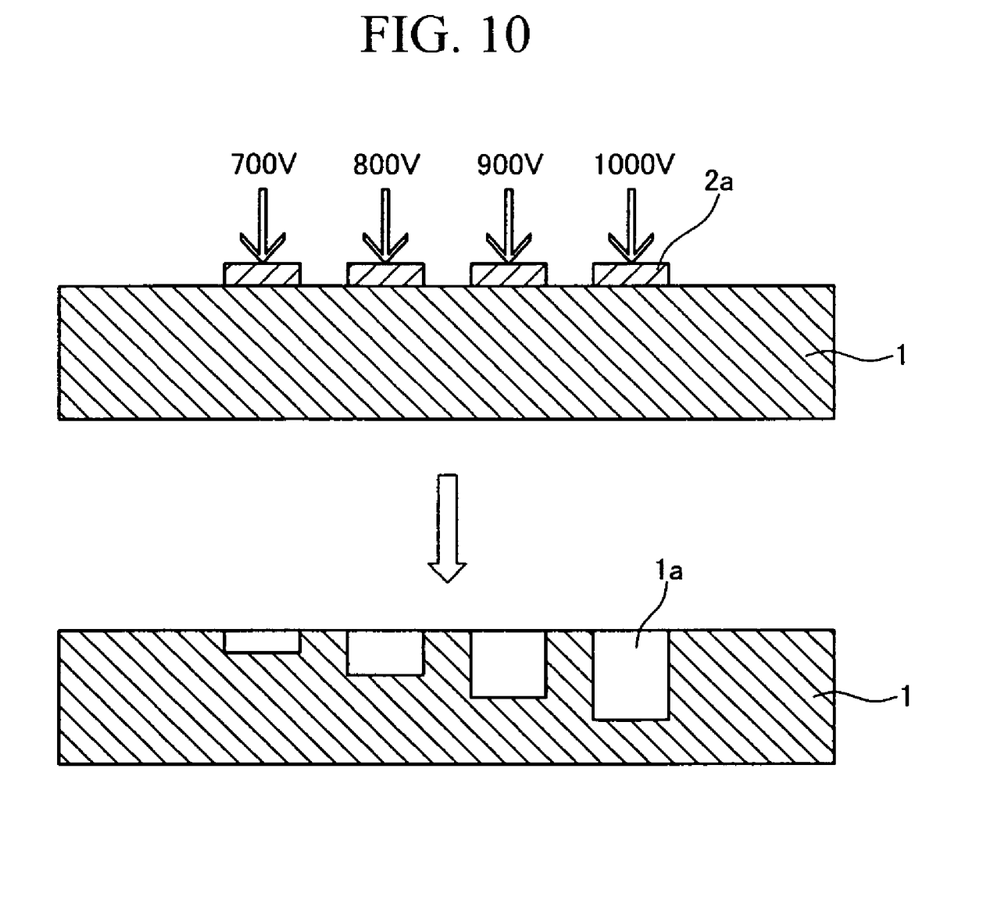
FIG. 10 is a drawing showing principal stages of a nano fabrication method for a glass according to Experimental Example 3.

In Experimental Example 3, the applied voltage of the electric filed is selected as a variable. When the thickness of the aluminum metal film pattern 2a and the heat treatment temperature of 500° C. are constant, the Pyrex glass substrate 1 is patterned to have different pattern depths.

FIG. 10 is a drawing showing principal stages of a nano fabrication method for a glass according to Experimental Example 3.

Referring to the drawing, in the molecule substituted step, the heat treatment temperature is maintained at 500° C., and different voltages of 700V, 800V, 900V, and 1000V are respectively applied to the pattern 2a.

After the metal film removing step and the etching step are performed, the pattern depth of the Pyrex glass substrate 1 is proportional to the applied voltage.

Figure 11:
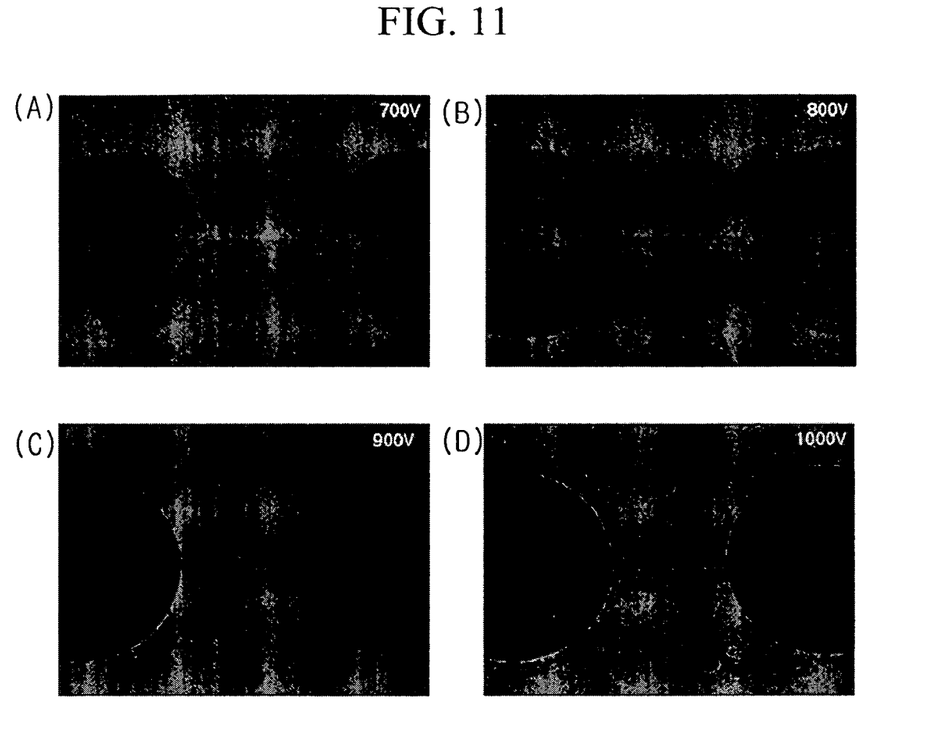
FIG. 11 is a collection of photographs showing results from a nano fabrication method for a glass according to the applied voltage of Experimental Example 3.

FIG. 11 is a collection of photographs showing results from a nano fabrication method for a glass according to the applied voltage of Experimental Example 3, and FIG. 12A to FIG. 12D are graphs showing results of a nano fabrication method for a glass consistent with applied voltages of Experimental Example 3.

As shown in the microscope photographs (a) to (d) of FIG. 11, as the applied voltage is increased, the image becomes clearer.

In addition, as shown in the graphs in FIG. 12A to FIG. 12D, as the applied voltage is increased, the pattern depth becomes deeper.

Figure 12A:
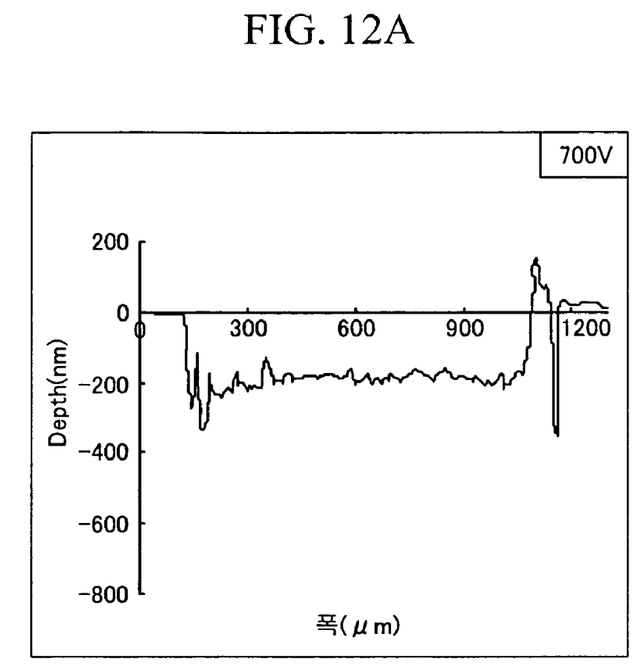
Figure 12B:
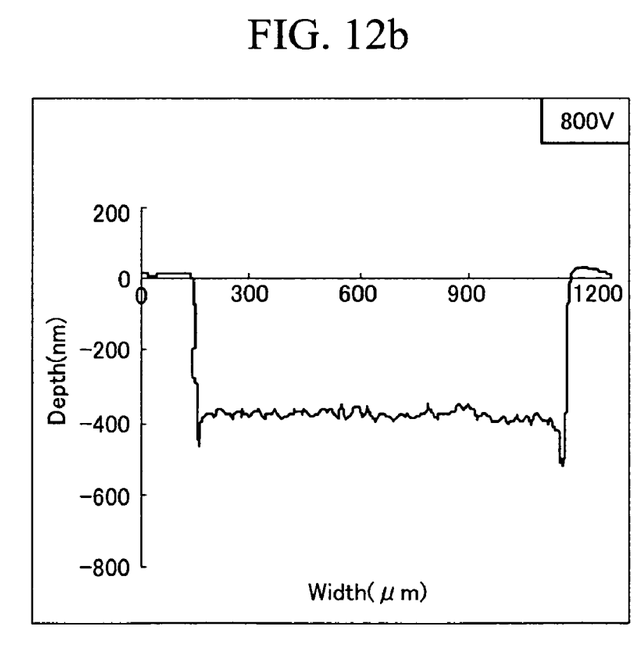
Figure 12C:
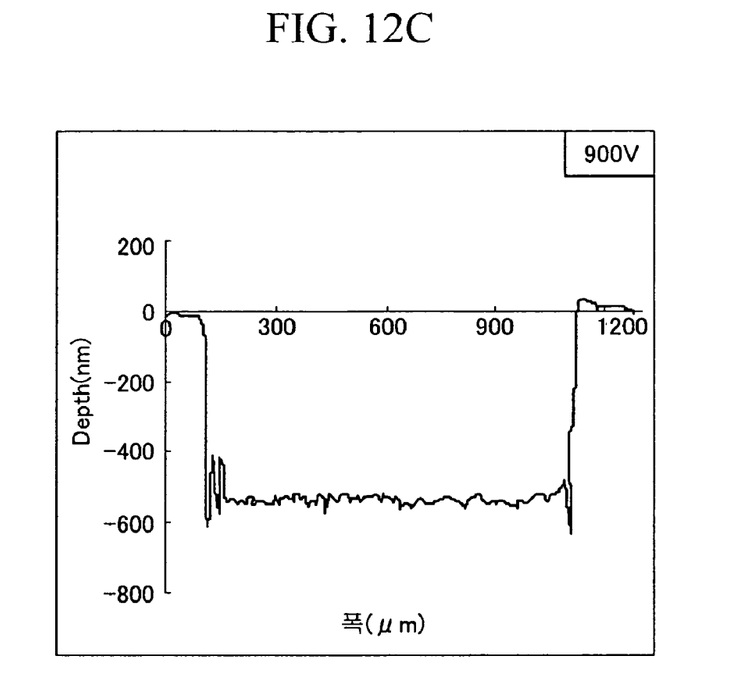
Figure 12D:
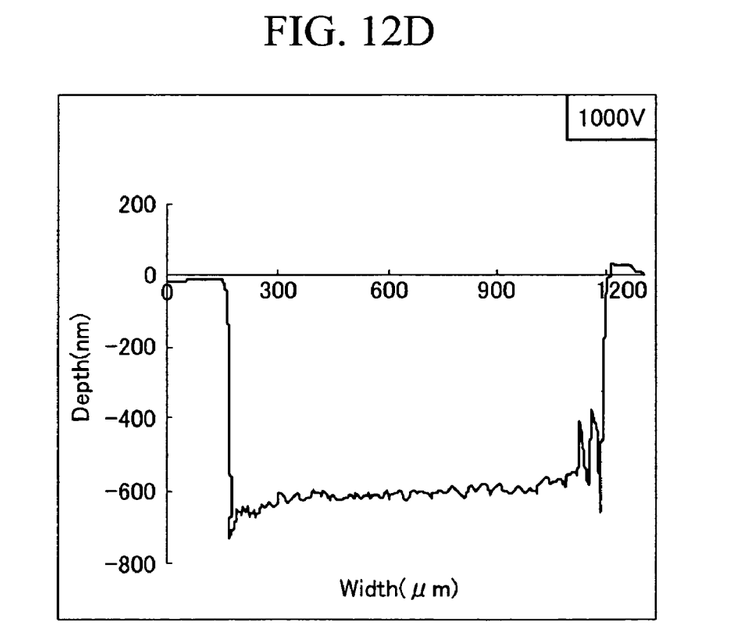

Consequently, the voltage for applying an electric field in the molecule substituting step in a nano fabrication method for a glass can be controlled so that the Pyrex glass substrate 1 can have a predetermined pattern depth.

Particularly, when different voltages are applied to different portions of the same glass substrate, patterns having different pattern depths can be obtained. Accordingly, a complex structure having different pattern depths on a same glass substrate can be fabricated.

As described in the above embodiments and Experimental Examples, the thickness of the aluminum metal film pattern 2a, the temperature of the heat treatment, and the voltage for applying an electric field can be controlled so that more complicated three-dimensional nano structures can be fabricated.

In addition, general wet etching methods have merits in processing speed and process cost, but they have some drawbacks in fabricating a small size pattern due to an isotropic etching profile. Therefore dry etching methods are usually adopted for fabricating general nano structures.

However, according to the nano fabrication method for a glass consistent with the present invention, even if a wet etching method is adopted, an anisotropic etching profile can be obtained. Therefore wet etching methods can be used for a nano scale fabrication. In addition, a conventional method for a micro electro mechanical system (MEMS) can be used for the present invention with a slight modification.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A nano fabrication method for a glass, comprising:
forming a molecule substituting layer whereby a crystal atom is a larger size than a glass crystal atom and the charge difference therebetween is less than or equal to one on a glass substrate;
patterning the molecule substituting layer correspondent to shapes to be patterned on the glass substrate;
substituting crystal atoms of the glass substrate with atoms of the molecule substituting layer;
removing the patterned molecule substituting layer from the glass substrate; and
etching the molecule substituted portion of the glass substrate.

2. The nano fabrication method for a glass of claim 1, wherein, in forming the molecule substituting layer, the molecule substituting layer is formed as a metal film that allows molecular replacement with crystal atoms of the glass substrate.

3. The nano fabrication method for a glass of claim 2, wherein the metal film is formed by a sputtering method.

4. The nano fabrication method for a glass of claim 2, wherein the metal film is formed by any thermal deposition method among a filament deposition, an electron beam deposition, an RF electric power deposition, and a flash deposition.

5. The nano fabrication method for a glass of claim 4, wherein the glass substrate is a boro-silicate glass substrate.

6. The nano fabrication method for a glass of claim 5, wherein the metal film is formed as an aluminum film.

7. The nano fabrication method for a glass of claim 1, wherein, in forming the molecule substituting layer, the molecule substituting layer is formed as a non-metal film that allows molecular replacement with crystal atoms of the glass substrate.

8. The nano fabrication method for a glass of claim 7, wherein the non-metal film is formed by a chemical vapor deposition method.

9. The nano fabrication method for a glass of claim 1, wherein, in patterning the molecule substituting layer, the molecule substituting layer is patterned by an exposure, a development, and an etching process.

10. The nano fabrication method for a glass of claim 9, wherein a pattern thickness of the molecule substituting layer is proportional to a pattern depth of the glass substrate.

11. The nano fabrication method for a glass of claim 1, wherein, in substituting crystal atoms of the glass substrate, the molecular replacement is activated by applying heat and an electric field to the glass substrate and the metal film.

12. The nano fabrication method for a glass of claim 11, wherein a pattern depth of the glass substrate is proportional to the voltage of the electric field.

13. The nano fabrication method for a glass of claim 11, wherein a pattern depth of the glass substrate is proportional to the temperature of the heat treatment.

14. The nano fabrication method for a glass of claim 11, wherein a pattern depth of the glass substrate is controlled by combination of the temperature of the heat treatment and the voltage of the electric field.

* * * * *